12/18/84 OR 4,488,784

United States Patent [19]

Kalt et al.

[11] Patent Number: 4,488,784

[45] Date of Patent: Dec. 18, 1984

[54] CAPACITIVELY COUPLED ELECTROSTATIC DEVICE

[76] Inventors: Andrew S. Kalt; Charles G. Kalt, both of Hawthorne Rd., Williamstown, Mass. 01267

[21] Appl. No.: 415,414

[22] Filed: Sep. 7, 1982

[51] Int. Cl.[3] .............. G05D 25/00

[52] U.S. Cl. .............. 350/359; 350/360

[58] Field of Search .............. 350/266, 360, 359; 361/271, 272; 307/109

[56] References Cited

U.S. PATENT DOCUMENTS 3,553,364 1/1971 Lee .............. 350/269
3,897,997 8/1975 Kalt .............. 350/161
4,094,590 6/1978 Kalt .............. 350/269
4,248,501 2/1981 Simpson .............. 350/266

*Primary Examiner*—John K. Corbin
*Assistant Examiner*—Paul M. Dzierzynski
*Attorney, Agent, or Firm*—Arthur K. Hooks

[57] ABSTRACT

An electrostatic device has a fixed electrode and a flexible-sheet-variable electrode mounted adjacent thereto and insulated therefrom. Fixedly spaced from a portion of the variable electrode is a third electrode to provide a fixed capacity therebetween. A voltage applied between the fixed and third electrode activates the device, and direct ohmic contact to the delicate variable electrode is not necessary.

11 Claims, 8 Drawing Figures

CAPACITIVELY COUPLED ELECTROSTATIC DEVICE

BACKGROUND OF THE INVENTION

This invention relates to electrostatic devices having a fixed electrode, an insulative layer and a variable resilient electrode that is electrostatically attracted to and extends over the fixed electrode to cause a change in the transmissivity or the reflectance of electromagnetic radiation such as heat or light. The invention more particularly relates to such an electrostatic device wherein the fixed electrode is split and the electrical activating voltage is applied between two fixed electrode pieces.

A large number of electrostatic devices with a resilient variable electrode are known. In each instance an activating voltage is applied between the fixed and the variable electrode. It is usually preferred to make the variable electrode of a thin plastic sheet having a film of aluminum deposited on at least one side. In the patents U.S. Pat. No. 3,897,997 and U.S. Pat. No. 4,094,590 to C. G. Kalt, issued Aug. 5, 1975 and June 13, 1978, respectively, and assigned to the same assignee as is the present invention, there are described a number of such devices. It was first noted that mounting and electrically terminating such delicate plastic material is very difficult to do without creating wrinkles, that emanate from the region of mounting and terminating, which wrinkles interfere with the uniform bending of the variable electrode when the device is activated. The problem of making reliable contact with the thin aluminum film that carries an air induced oxide is especially difficult. The electrical contact is usually needed in the same region of the variable electrode at which it must be mounted. Whether that involves soldering, welding, staking, or providing a deposit of conductive resin or a pressure contact, it represents a potential source of distortion and wrinkling in this critical mounting region.

It is an object of the present invention to provide an electrostatic device having one or more variable electrodes that do not require ohmic contact thereto.

It is a further object of this invention to provide such a device that is simpler in manufacturing leading to greater reliability and lower cost.

SUMMARY OF THE INVENTION

An electrostatic device for use as an electrically controlled device with changing reflectivity or transmissivity to light or heat is described. A portion of a flexible-variable-sheet electrode as mounted and at rest is adjacent to a fixed electrode. A film of electrically insulative material is positioned between the fixed and variable electrodes so that a voltage applied between the fixed and variable electrodes causes the flexible variable electrode to move toward and become coadunate with the fixed electrode. A pair of terminals provide electrical access to the device from an activating voltage source. One of the terminals is ohmically connected to the fixed electrode. A salient feature of this invention is a capacitive coupling means for capacitively connecting the other of the terminals to the variable electrode so as to obviate the need for making an ohmic contact thereto.

This is preferably accomplished by providing a third electrode to which the other terminal is ohmically connected and which third electrode is fixedly spaced and insulated from a portion of the variable electrode.

DESCRIPTION OF THE PREFERRED EMBODIMENTS

Figure 1:
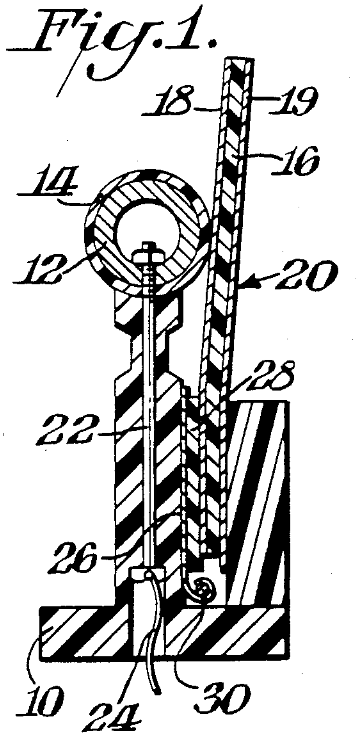
FIG. 1 shows in side sectional view an electrostatic device of this invention.

The electrostatic device of FIG. 1 has a plastic base 10, a fixed electrode 12 in the form of a metal tube, an insulating layer 14 over the fixed electrode 12 and a double metallized resilient sheet of polyethylene terephthalate (MYLAR) 16 having vacuum-deposited films of aluminum 18 and 19. The plastic sheet 16 with conductive metal films 18 and 19 serve as the variable electrode similar to that described in the aforementioned patent U.S. Pat. No. 3,897,997 and shown in FIG. 8 therein. A metal bolt 22 holds the fixed electrode 12 to base 10 and electrically connects electrode 12 to the termination or lead wire 24. As is taught in the patent, when a voltage is applied between the fixed electrode 12 and the variable electrode 20, the variable electrode bends toward and becomes coadunate with the insulated fixed electrode 12. Unlike in the patent, however, there is no electrical termination provided to the variable electrode 20. Instead, a third electrode 26, a metal foil, is spaced from the metal film 18 by a plastic insulating layer 28, and a termination 30, consisting of lead wire seen in end view is attached to the bottom edge of the foil 26.

The metal film 18 of variable electrode 20 and the third electrode 26 thus have a significant capacitive relationship, especially in comparison with that existing between the fixed electrode 12 and the metal film 18 that is merely tangent thereto when at rest, i.e. when the device is not energized and activated. For that reason when a voltage is first applied between terminations 24 and 30 most of the applied voltage appears between the fixed electrode 12 and variable electrode 20 to initiate activation with the substantially the same force as for the old device in the patent.

As the upper edge of the variable electrode 20 bends over and covers more and more of the insulated outer cylindrical surface of the fixed electrode 12, the capacity to the variable electrode 20 increases and the activating voltage decreases. However, since the strong initial electrostatic activating force gives a large momentum to the variable electrode, the time required for fully activating the device can surprisingly be nearly as short as required for the corresponding device of the prior art.

Figure 2:
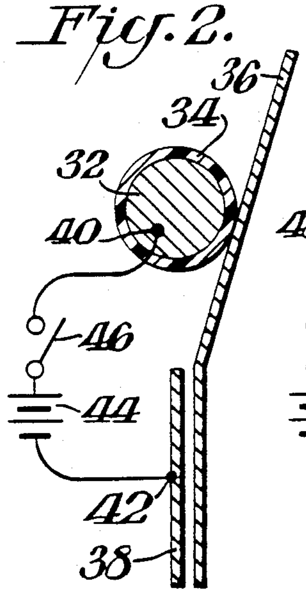
FIG. 2 shows in side sectional view a simplified picture of a device similar to that of FIG. 1.

Key features of the electrostatic device of FIG. 1 are illustrated in free-body style in FIG. 2. Fixed electrode 32, a metal rod, is coated with an insulative layer 34. A foil variable electrode 36 has a lower portion spaced from a third electrode 38 also of foil. There is shown schematically a termination 40 at the fixed electrode 32 and a termination 42 at the third electrode. Activating voltage is supplied from a battery 44 through a switch 46.

Figure 3:
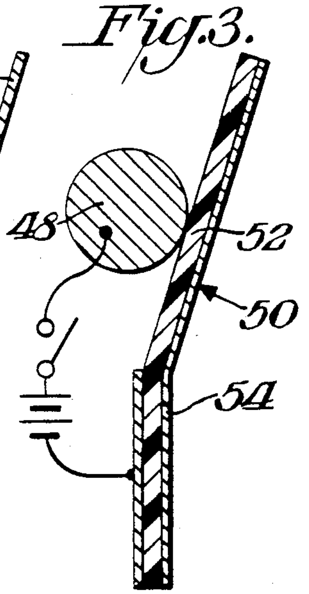
FIG. 3 shows in side sectional view a simplified picture of a modified version of the device of FIG. 2.

Key features of another but similar electrostatic device of this invention are illustrated in FIG. 3. Insulation between the fixed and variable electrodes 48 and 50 is provided in the variable electrode that consists of a plastic sheet 52 and a metal film 54.

Figure 4:
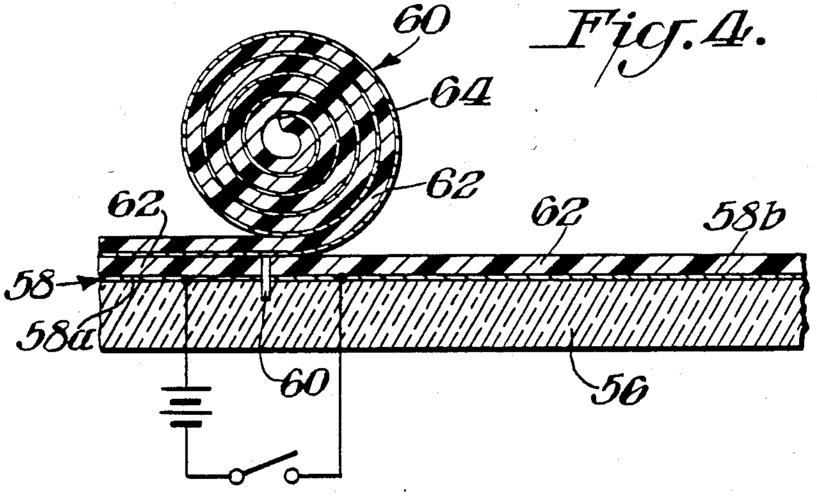
FIG. 4 shows in side sectional view a rolling-electrode-type electrostatic device of this invention.

Referring to FIG. 4, a glass base plate 56 carried on its top surface an electrically conductive film 58 that is separated by a gap into two pieces **58*a* and 58*b*. A transparent plastic layer 62 overlies the conductive film 58. The spiralled variable electrode 60 made of a MYLAR sheet 62 having an opaque aluminum film 64 on the outside surface is shown at rest. An activating source consisting of battery 66 and the switch 68 is connected across the film portions 58*a* and 58*b***.

Figure 5:
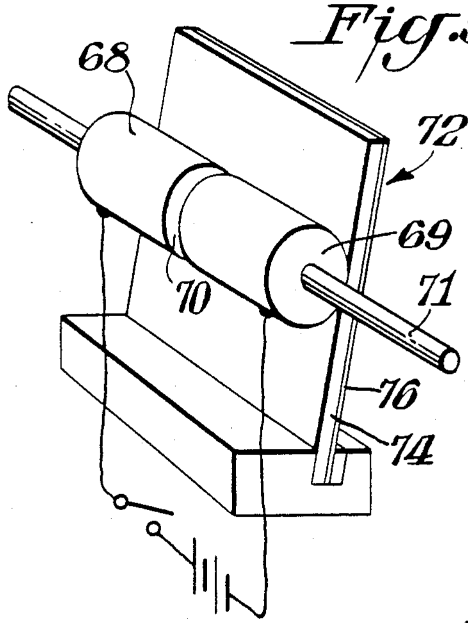
FIG. 5 shows in isometric view a simplified-picture of a flapper-electrode-type device, with a split fixed electrode, of this invention.

The electrostatic device of FIG. 5 includes two equal diameter and equal length cylindrical metal ferrules 68 and 69 that are mounted coaxially with a gap 70 therebetween on an insulative rod 71. A planar variable electrode 72 is shown mounted tangent to the outer surfaces of the fixed electrodes consisting of ferrules 68 and 69. The variable electrode 72 consists of MYLAR sheet 74 and aluminum film 76.

The term cylindrical, as used herein, means having a surface generated by a line which moves so that it is always parallel to a fixed line and always intersects a fixed curve. See Analytic Geometry by R. R. Middlemiss, McGraw Hill, New York, 1945 page 267.

Figure 6:
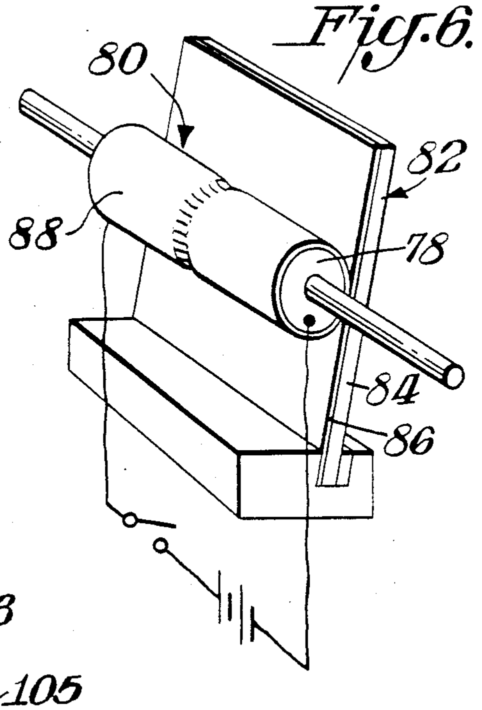
FIG. 6 shows in isometric view a simplified picture of another flapper-electrode-type device, with split fixed electrodes, of this invention.

The similar device in FIG. 6 has two equal diameter spaced metal ferrules 78 and (79 not seen). An insulative layer covers the cylindrical surfaces of the ferrules. This insulated and split fixed electrode 80 is mounted abutting a planar variable electrode 82 consisting in a MYLAR sheet 84 and a vacuum deposited aluminum film 86.

When a voltage is applied between the pair of identical fixed electrodes 68 and 69 or 78 and 79 (not seen) in either of the devices of FIGS. 5 and 6, respectively, the variable electrode 72 or 82 is electrostatically drawn and held over the fixed electrodes 68/69 or 78/79, respectively. Twice the voltage is required compared to that necessary to obtain the same action in a corresponding device of the prior art. This is evident since the applied voltage is split equally between the nearly equal capacities between the floating variable electrode 72 or 82 and each of the equally long ferrules 68/69 or 78/79. Layer 88 is electrically insulating.

Figure 7:
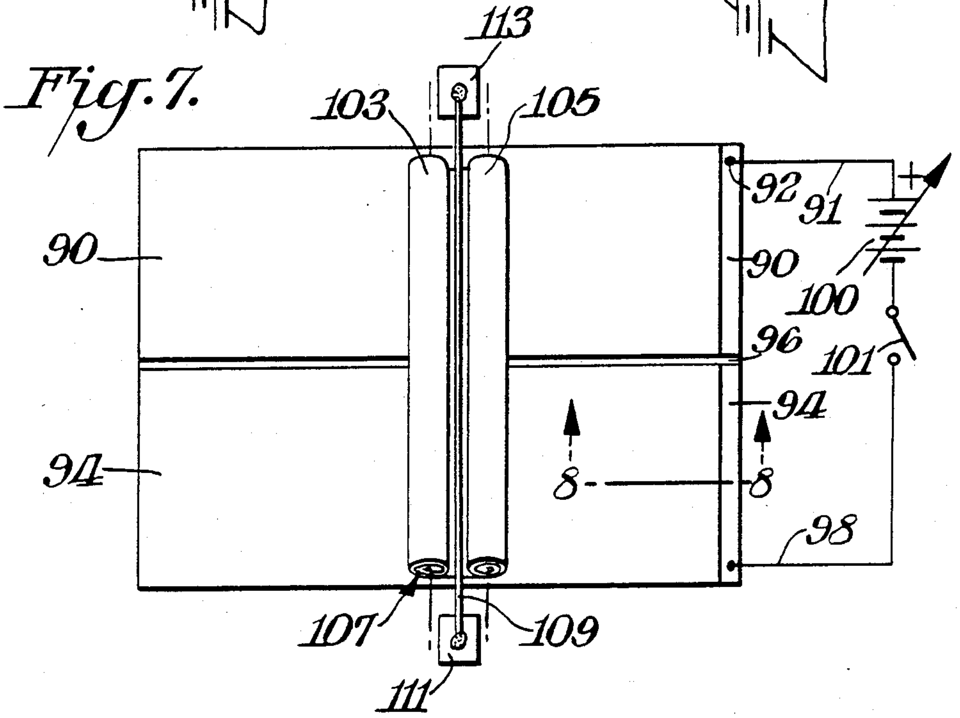
FIG. 7 shows in plan (top) view a dual-rolling-electrode electrostatic device of this invention.
Figure 8:
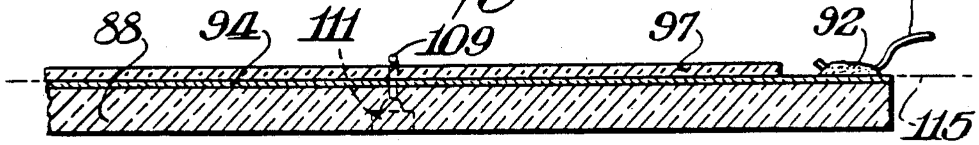
FIG. 8 shows a magnified view of the fixed electrodes assembly of FIG. 7 taken in section 8—8.

Referring now to FIGS. 7 and 8, a base plate of glass 88 carries a conductive transparent tin oxide film 90. A lead or termination wire 91 is attached by means of conductive epoxy 92 to the conductive tin oxide film 90. A second tin oxide film 94 also overlies the glass plate 88 spaced from film 90 by a small gap 96 to provide electrical isolation therebetween. Films 90 and 94 serve as a pair of fixed electrodes having an electrically insulative but transparent amorphous silica 97 deposited over all but an edge portion of the electrodes 90 and 94 to provide access through termination wires 91 and 98 to a source of activating voltage, e.g. battery 100 and switch 101.

Two cylindrical spiral rolls 103 and 105 are formed by prestressing a single metallized MYLAR sheet 107, the metal being on the outside of the rolls (as in the device of FIG. 4). A preferred method for so prestressing the metallized plastic sheet to curl it and form a spiral roll is described by C. G. Kalt in U.S. Pat. No. 4,266,339 issued May 12, 1981 and assigned to the same assignee. The center of the sheet 107 is pressed against the insulated fixed electrodes 90 and 94 by stretching a string or cable 109 between two anchoring points 111 and 113 that are below, or away from the plane 115 of the fixed electrodes 90 and 94. This taut-band means of holding the delicate MYLAR sheet 107 is especially appropriate when the sheet is very thin, e.g. 0.25 mils (0.006 mm), since it produces a minimum amount of distorting stresses in the plastic that leads to wrinkles radiating away from the mounting region. As is well documented, such wrinkles diminish the sensitivity of the device. When mounted as shown, activation of the device by closing switch 101 causes the variable electrode rolls 103 and 105 to move in opposite directions to substantially cover the insulated fixed electrodes 90 and 94.

What is claimed is:

1. An electrostatic device of the kind having a fixed electrode, a variable electrode comprising a sheet of resilient material having at least one electrically conductive surface, a portion of said variable electrode being held at rest adjacent to said fixed electrode and a film of electrically insulative material positioned between said fixed and variable electrodes to maintain electrical isolation therebetween so that an electric field generated between said fixed and variable electrodes causes said variable electrode to bend and to become coadunate with said fixed electrode, a pair of electrical terminals for providing electrical access to said device to which a voltage source may be connected to generate said field and activate said device, one of said terminals being ohmically connected to said fixed electrode, wherein the improvement comprises for electrically exciting said variable electrode, only a capacitive means for capacitively connecting the other of said terminals to said variable electrode and for rendering said variable electrode electrically floating.

2. The electrostatic device of claim 1 wherein said capacitive means comprises a third electrode being insulated and held fixedly spaced from a portion of said variable electrode, said third electrode being connected ohmically to the other of said terminals.

3. An electrostatic device of the kind including a fixed electrode; a variable electrode comprising a sheet of resilient material having at least one electrically conductive surface, a portion of said variable electrode being held at rest adjacent to a portion of said fixed electrode; and a film of electrically insulative material positioned between said fixed and variable electrodes to maintain electrical isolation therebetween wherein the improvement comprises a third electrode being adjacent, spaced from and having a significant fixed capacitive relationship with said variable electrode, and a pair of electrical terminations connected directly to the fixed and third of said electrodes, respectively, to which a voltage may be connected to activate said device, said variable electrode having no direct electrical connection thereto so as to be electrically floating.

4. An electrostatic device comprising two fixed electrodes lying in a geometrically cylindrical surface, a gap between said fixed electrodes running orthogonal to the axes of said cylindrical surface; a variable electrode comprised of a sheet of resilient material having at least one electrically conductive surface, a portion of said variable electrode being held ar rest adjacent to said two fixed electrodes; and a film of electrically insulative material positioned between said variable and said two fixed electrodes to maintain electrical isolation therebetween so that a voltage applied between said two fixed electrodes will cause said variable electrode to become coadunate with said two fixed electrodes, said variable electrode having no direct electrical connection thereto so as to be electrically floating.

5. The device of claim 4 wherein said geometrically cylindrical surface has a distinct fixed radius and said variable electrode is about flat at rest.

6. The device of claim 4 wherein said geometrically cylindrical surface is about flat and said variable electrode at rest takes the shape of a spiral roll.

7. An electrostatic device comprising:

a pair of fixed electrodes, a surface of each of said fixed electrodes lying in a plane, said fixed electrodes being separated by a gap to affect electrical isolation therebetween;

an electrically insulative layer overlying said planar surfaces of said pair of fixed electrodes;

one variable electrode comprised of a portion of a resilient sheet that having been prestressed takes the form of a spiral roll at rest, at least the outside surface of said spiralled resilient sheet being electrically conductive, said variable electrode having no direct electrical connection thereto so as to be electrically floating; and a holding means for holding an outer-spiral portion of said one variable electrode against said insulative layer in an orientation for making the axis of said spiral roll about orthogonal to the direction of said gap between said pair of fixed electrodes so that when a voltage is applied between said of fixed electrodes, said variable electrode unrolls and extends coadunately over said insulated fixed electrodes.

8. The electrostatic device of claim 7 additionally comprising a transparent glass base plate, said pair of fixed electrodes consisting of thin films of conducting tin oxide, respectively, and said insulative layer being made of a transparent material overlying said tin oxide electrodes except at minor peripheral regions thereof, respectively, and two electrical terminals being formed at said exposed peripheral regions in said tin oxide electrodes.

9. The electrostatic device of claim 8 wherein said transparent layer consists of an amorphous silica.

10. The electrostatic device of claim 7 wherein said resilient sheet extends beyond said held portion thereof in a direction away from said one variable-electrode-spiral roll, said extended sheet portion being another variable electrode having been prestressed to take the form of another spiral roll at rest tending to roll toward said one variable electrode so that when a voltage is applied across said pair of fixed electrodes the one and another variable electrodes extend in opposite directions coadunately over said insulated fixed electrodes.

11. The electrostatic device of claim 10 wherein said holding means is comprised of a taut band mounted over said outer spiral portion of said variable electrode and pressing said outer spiral portion against a region of said fixed electrodes that is central with respect to the directions of said gap therebetween.

* * * * *